S. K. ALLMAN.
BUMPER FOR AUTOMOBILES.
APPLICATION FILED JUNE 22, 1920.

1,378,000.

Patented May 17, 1921.

WITNESS:
Robt. R. Kitchel.

INVENTOR
Sydney K. Allman
BY
Frank S. Busser
ATTORNEY.

UNITED STATES PATENT OFFICE.

SYDNEY K. ALLMAN, OF JENKINTOWN, PENNSYLVANIA.

BUMPER FOR AUTOMOBILES.

1,378,000.     Specification of Letters Patent.     Patented May 17, 1921.

Application filed June 22, 1920. Serial No. 390,946.

*To all whom it may concern:*

Be it known that I, SYDNEY K. ALLMAN, a citizen of the United States, residing at Jenkintown, county of Montgomery, and State of Pennsylvania, have invented a new and useful Improvement in Bumpers for Automobiles, of which the following is a full, clear, and exact description, reference being had to the accompanying drawings, which form a part of this specification.

This invention relates to an improvement in rear bumpers for automobiles, and is designed to provide an efficient device of this character which will not only act as a bumper, but will also prevent the theft of a spare tire or tires, carried on the usual tire support on the rear of the car.

This is accomplished by providing the bumper with a projection which extends forwardly from the bumper into the tire support, in such a manner that at least this portion of the bumper must be removed to free the tire. In order to avoid the necessity of removing the bumper to free the tire, I prefer to form the bumper of several members, which are hinged and locked to each other in such a manner that it is only necessary to open the lock and then swing one member on the other, about the axis of the hinge, to free the tire.

The precise nature of my invention will be best understood by reference to the accompanying drawings, which will now be described, it being premised, however, that the form of the bumper as well as the connecting means may be changed, without departing from the scope of my invention, as defined in the claims.

Figure 1:
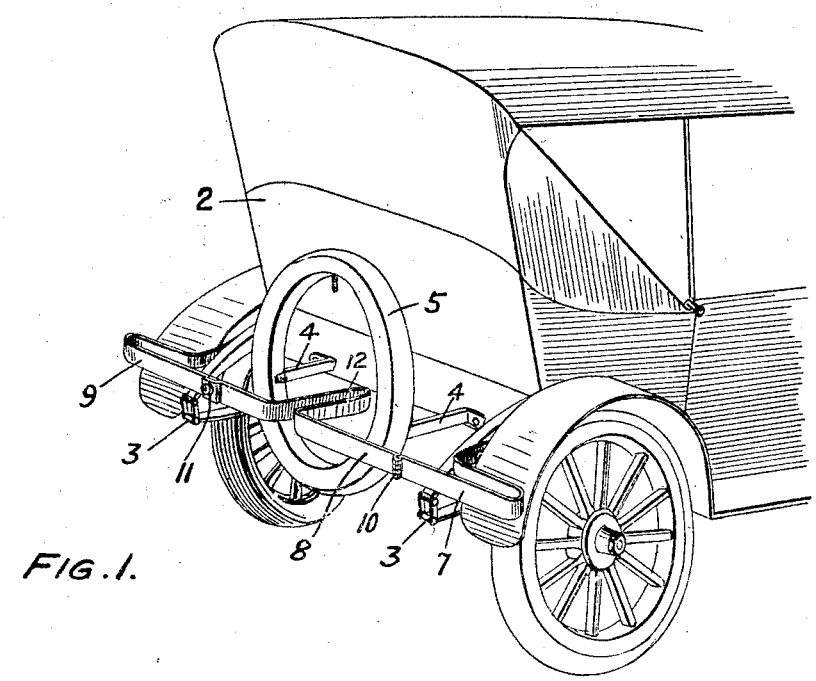

Figure 1 of the drawings, is a perspective view of an automobile to which is attached one form of my improved bumper.

Figure 2:
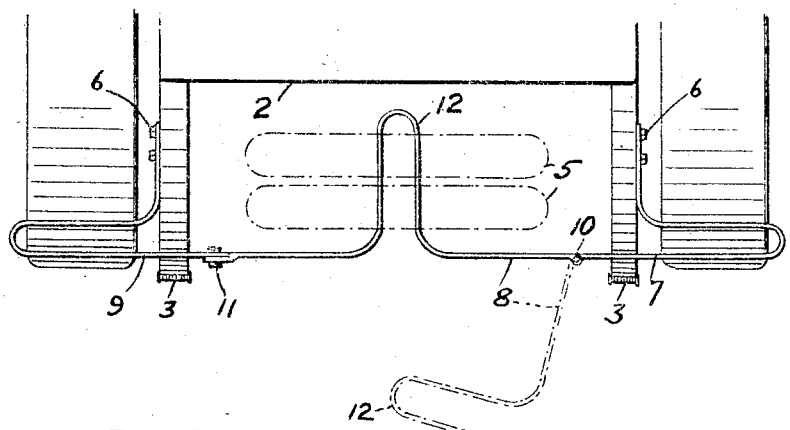

Fig. 2 is a plan view of a portion of Fig. 1.

In these drawings the reference character 2 designates the body of an automobile and 3 the rear springs. 4 is a common form of spare tire support connected to the rear of the body 2, to which is attached in the usual way a spare tire 5.

Connected to the rear of the car by bolts 6 is a bumper formed of members 7, 8 and 9, the members 7 and 9 being secured to the car as above described. The member 8 is hinged to the member 7 at 10, and has connected to the other end thereof a lock 11, which is arranged to fixedly lock the ends of members 8 and 9 to each other. The member 8 is bent upon itself at its intermediate portion to form a forwardly extending projection 12, which is so disposed that it passes into the open space of the tire support 4 and will prevent the removal of the tire.

If it is desired to remove the tire 5, the lock 11 is unlocked and the member 8 is swung to the position shown in dotted lines, and the tire is then free to be removed from the support.

The advantages of my invention result from the provision of a rear bumper for automobiles, having a member thereon adapted to extend forwardly within the wheel opening of a spare tire supported on the rear of the automobile, to prevent the removal of the tire without withdrawing the forwardly extending member from the opening in the tire, or tire support.

Having now fully described my invention, what I claim and desire to protect by Letters Patent is:

1. A rear bumper for an automobile, having a forwardly extending projection connected thereto and wholly supported therefrom, said projection being adapted to enter the space within a spare tire support and to be withdrawn when the bumper is removed.

2. A bumper for an automobile, having a plurality of members, a hinged connection for one end of one of said members, means for locking the other end of said member, and a forwardly extending projection connected to said member and wholly supported therefrom, said projection being arranged to enter the space within a spare tire support.

3. A bumper for an automobile, having a plurality of members, a hinged connection for one end of one of said members, means for locking the other end of said member, and a forwardly extending projection wholly supported therefrom, said projection being formed by bending said member upon itself and being arranged to enter the space within a spare tire support.

4. The combination with an automobile having a spare tire support thereon, of a rear bumper having a projection connected thereto and wholly supported therefrom, said projection extending forwardly into the open space of the tire support to prevent the removal of a tire, until after the projection has been withdrawn from the open space of the support by the removal of the bumper.

5. The combination with an automobile having a spare tire support thereon, of a rear bumper formed of a plurality of members, two of said members being hinged to each other, a lock connected to the hinged member and arranged to lock said member to another member of the bumper, and a forwardly extending projection on the hinged member forming a fixed portion thereof and arranged to project into the opening in a tire on said support, when in its locked position, and to move clear of the tire when the one member is moved relative to the other.

In testimony of which invention, I have hereunto set by hand, at Philadelphia, Pa., on this 21st day of June, 1920.

SYDNEY K. ALLMAN.